Feb. 15, 1955                 C. L. STRAHOTA ET AL                 2,702,106
                       CLUTCH AND BRAKE FOR POWER TRANSMITTERS
Filed May 5, 1949                                                2 Sheets-Sheet 1
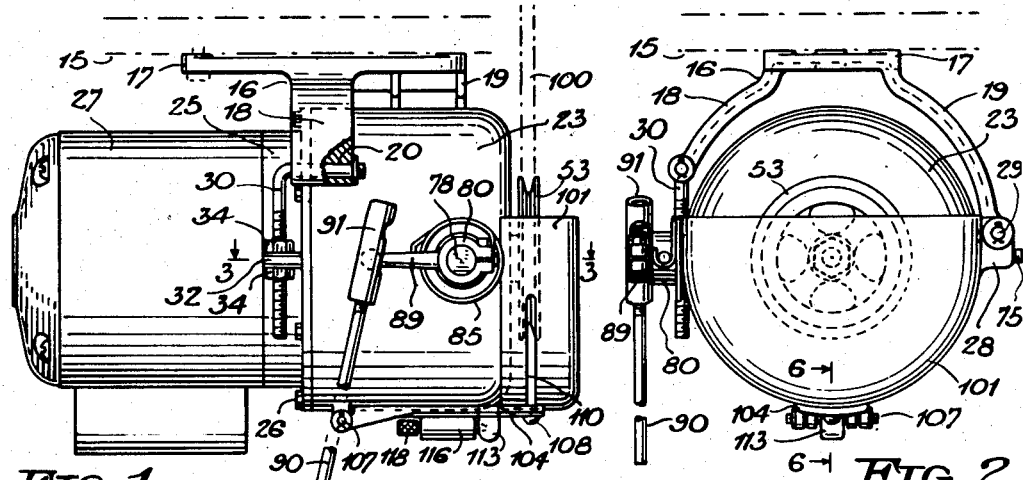
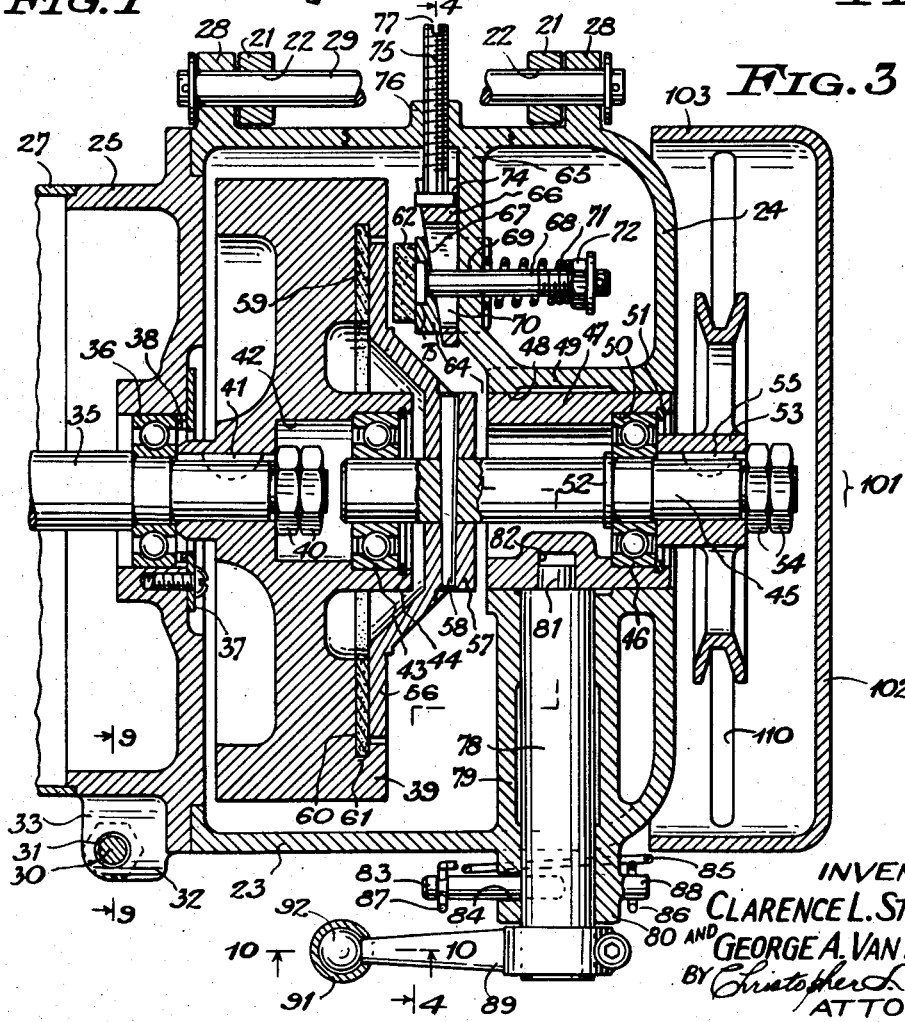
INVENTORS
CLARENCE L. STRAHOTA
AND GEORGE A. VAN DOMLEN
BY Christopher L. Waal
ATTORNEY Feb. 15, 1955 C. L. STRAHOTA ET AL 2,702,106
CLUTCH AND BRAKE FOR POWER TRANSMITTERS
Filed May 5, 1949 2 Sheets-Sheet 2
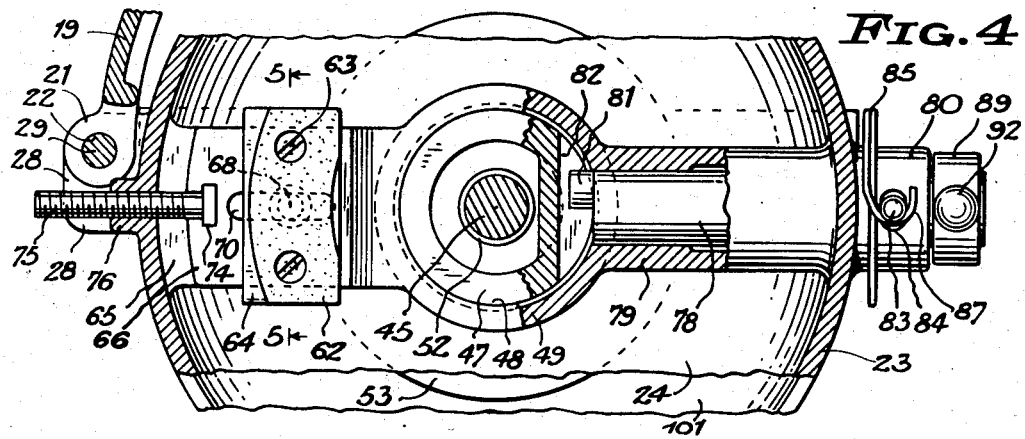
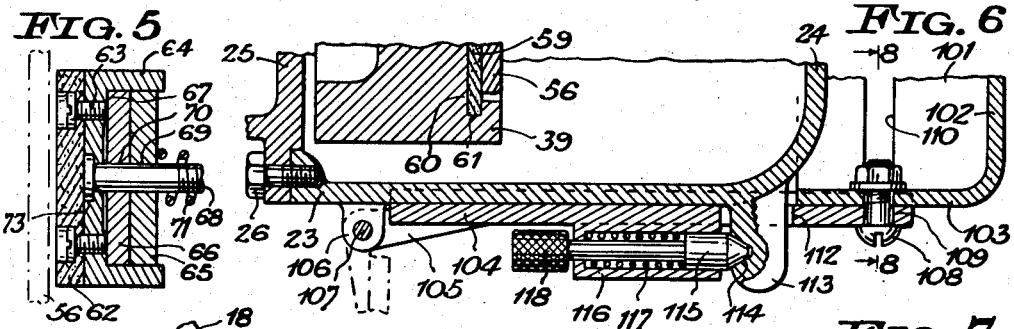
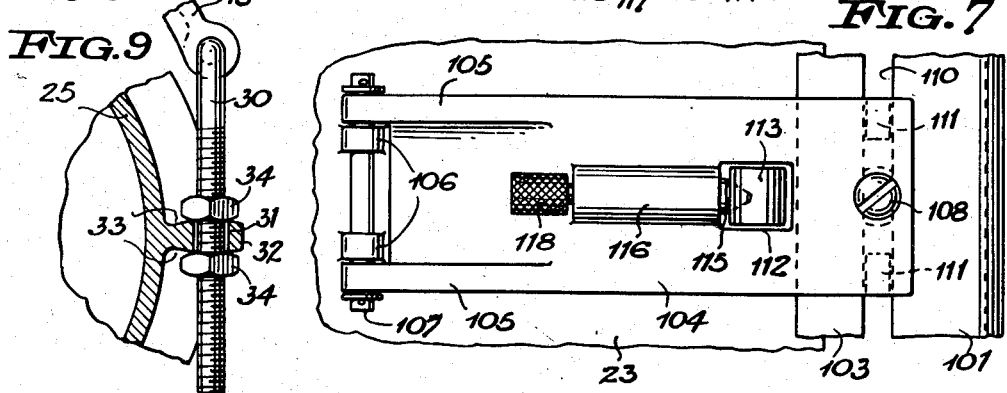
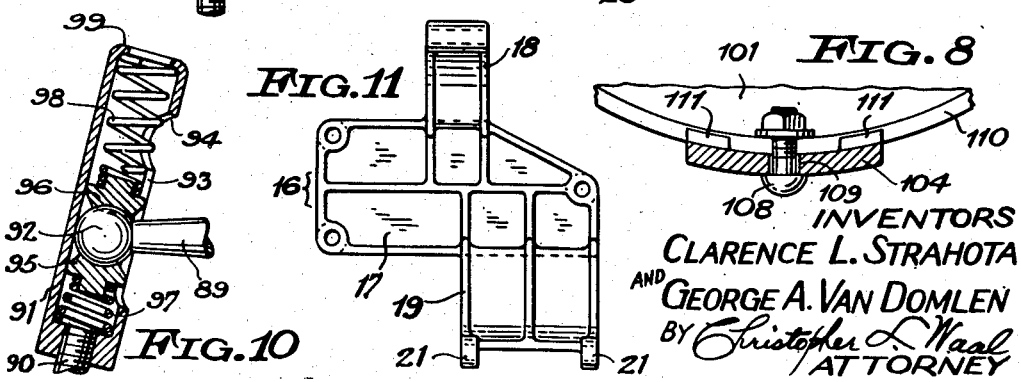
INVENTORS
CLARENCE L. STRAHOTA
AND GEORGE A. VAN DOMLEN
BY
ATTORNEY

United States Patent Office 2,702,106
Patented Feb. 15, 1955

2,702,106

CLUTCH AND BRAKE FOR POWER TRANSMITTERS

Clarence L. Strahota, Milwaukee, and George A. Van Domlen, Wauwatosa, Wis., assignors to Milwaukee Electric Transmitter, Inc., Milwaukee, Wis., a corporation of Wisconsin Application May 5, 1949, Serial No. 91,528

9 Claims. (Cl. 192—18)

The present invention relates to power transmitters adapted for driving sewing machines and the like.

An object of the invention is to provide an electric power transmitter having improved control means for axially shifting a rotatable driven member thereof between clutching and braking positions.

Another object is to provide a power transmitter having simple and easily adjusted braking means for quickly stopping the rotation of the driven member after it is released from its clutching position.

Still another object is to provide a power transmitter which is so arranged as to facilitate alignment of the rotating parts and to reduce wear and noise.

A further object is to provide a power transmitter having improved guard means and mounting means to facilitate belt changing and adjustment of belt tension.

A still further object is to provide a power transmitter which is of simple, durable and inexpensive construction, and which is reliable, safe, and quiet in operation.

The invention further consists in the several features hereinafter described and claimed.

In the accompanying drawings,

Fig. 1 is a side elevation of an electric power transmitter constructed in accordance with the invention, parts being shown in section;

Fig. 2 is an end view of the transmitter;

Fig. 3 is a longitudinal sectional view taken generally on the line 3—3 of Fig. 1, the transmitter being shown in clutching position;

Fig. 4 is a transverse sectional view taken generally on the line 4—4 of Fig. 3;

Fig. 5 is a detail sectional view taken generally on the line 5—5 of Fig. 4;

Fig. 6 is a sectional view taken generally on the line 6—6 of Fig. 2;

Fig. 7 is a fragmentary bottom view showing a hingedly mounted pulley guard;

Fig. 8 is a detail sectional view taken on the line 8—8 of Fig. 6;

Fig. 9 is a detail sectional view taken on the line 9—9 of Fig. 3;

Fig. 10 is a detail sectional view taken on the line 10—10 of Fig. 3, and

Fig. 11 is a detail bottom view of a mounting bracket.

In the drawings, 15 designates a work bench or table for supporting thereon a sewing machine or other machine, not shown, adapted to be driven by the power transmitter of the invention.

A mounting bracket or hanger 16 has an apertured base portion 17 adapted to be bolted or screwed to the underside of the table and has curved downwardly projecting front and rear arms 18 and 19. The front arm 18 has a horizontal bore 20 at its lower end, and the rear arm 19, which extends lower than the front arm, has spaced terminal ears 21 with aligned horizontal bores 22 extending parallel to the bore 20.

A transmitter frame or casing is disposed between the bracket arms 18 and 19 and comprises a cup-shaped cylindrical casing member 23 with an end wall 24, the other end of the casing member having an annularly flanged closure member 25 secured thereto, as by screws 26. The closure member forms an end bell of an electric motor 27 arranged coaxially of the casing. The casing member 23 has laterally projecting ears 28 which flank the bracket arm ears 21 and are supported thereon by an axially confined pivot rod 29 extending through the several ears. An angle-shaped suspension rod 30 has an upper horizontal portion pivotally confined in the horizontal bore 20 of the front bracket arm 18, and has a screw-threaded depending shank portion extending through an opening 31 in a radial lug 32 formed on the side of the closure member 25. The lug 32 has convexly curved upper and lower surfaces 33, Fig. 9, which are engaged by nuts 34 on the suspension rod 30. By adjusting the nuts the pivotally supported transmitter casing can be raised and lowered and retained in adjusted position.

The electric motor 27 has a horizontal shaft 35 coaxial with the casing member 23 and journalled in a ball bearing 36 secured in the closure member 25, as by means including a retaining plate 37 and spring washer 38. The end of the motor shaft projects into the casing member 23 and carries a hubbed fly-wheel 39 which is secured to the shaft by nuts 40 and a key 41. The hub of the fly-wheel has a central shouldered bore 42 receiving the nuts 40 and a ball bearing 43 which is secured in place as by a snap ring 44.

An output or driven shaft 45 extends in the casing member 23 coaxially of the motor shaft and has an end portion axially slidable in the inner race of the ball bearing 43 and supported by this bearing. Near its other end the shaft is supported by a ball bearing 46 carried in the outer end portion of a sleeve or quill 47 through which the shaft projects. The sleeve is axially slidable in the bore 48 of a tubular hub 49 formed centrally on the inner side of the end wall 24 of the casing member 23 in coaxial relation to the driven shaft. The outer race of the ball bearing 46 is disposed in a shouldered bore 50 of the sleeve and is secured therein as by a snap ring 51. The inner race of the bearing is clamped to the driven shaft 45 between an annular flange 52 on the shaft and the hub of a V-grooved belt pulley 53 which is carried on the projecting end of the shaft, the pulley being secured to the shaft by nuts 54 and a key 55. The hollow hub portion of the fly-wheel projects axially towards the sleeve 47, and this projecting hub portion has mounted therein the ball bearing 43. The ball bearings 36, 43, and 46 are preferably of the grease-sealed type, which will run for long periods without attention.

A centrally recessed, flat-faced clutch disk or plate 56 of light-weight metal has a hub portion 57 secured to the axially shiftable shaft 45 between the fly-wheel hub and the sleeve 47, as by a cross pin 58. The flat annular clutch portion of the clutch disk is axially offset from the hub portion 57 thereof towards the fly-wheel and surrounds the ball bearing 43 and the projecting hollow hub portion of the fly-wheel, the annular clutch portion and ball bearing lying in the same radial plane. One face of the clutch disk is releasably engageable with a flat annular clutch lining member 59 of cork or other suitable material secured, as by cementing, to the flat bottom face of a circular recess 60 formed in the fly-wheel, the periphery of the recess being undercut at 61 to receive the outer edge of the lining. The other face of the disk is releasably engageable with a flat brake lining member 62 secured, as by screws 63, to a channel-shaped brake shoe or block 64 which slidably embraces a flat radially extending bridge bar 65 formed in the casing member 23. Between the brake shoe and the bridge bar is interposed a radially shiftable adjustable wedge 66 which fits between the side flanges of the brake shoe and engages an inclined wedge surface 67 on the brake shoe. A spring-pressed retaining bolt 68 holds the brake block against the wedge and slidably extends through an opening 69 in the bridge bar and a longitudinal slot 70 in the wedge. The bolt is urged in retaining direction by a compressed coiled spring 71 surrounding the bolt and interposed between the bridge bar and a nut 72 on the bolt. The head of the bolt 68 is disposed in a recess 73 formed in the brake shoe. The outer end of the wedge 66 has a T-slot 74 receiving the head of a radially extending adjusting screw 75 which is screw-threaded through a radial boss 76 formed on the casing member 23, the outer end of the screw having a screw-driver slot 77. The brake is thus readily adjustable from the exterior of the transmitter.

A horizontal rock-shaft 78 is journalled in a tubular bearing portion 79 formed radially in the casing member 23 between the hub portion 49 and the cylindrical wall of the casing member, the outer end of the tubular portion forming a boss 80, the tubular portion defining therein a bore opening at its outer end at the boss 80 and opening at its inner end at the bore 48 of the tubular hub 49. The inner end of the rock-shaft has formed thereon an eccentric pin 81 which projects from the open inner end of the bore in the tubular portion 79 and fits in a transverse parallel-sided slot or channel 82 formed in the periphery of the slidable sleeve 47. The eccentric pin 81 is within the projected circumference of the rock-shaft, thus permitting the rock-shaft to be readily inserted into the tubular bearing portion 79 from the outer side of the casing member. The outer portion of the rock-shaft 78 carries a laterally projecting arm-forming pin 83 which extends through a radial opening or slot 84 formed in the boss 80, thus confining the rock-shaft against outward displacement. A coiled tension spring 85 surrounds the boss 80 and has hooked ends 86 and 87, one of which is anchored on a lug 88 on the boss and the other of which is anchored on the annularly grooved outer end of the pin 83. The spring 85 acts to turn the rock-shaft in a direction to shift the sleeve 47 and driven shaft 45 outwardly for releasing the clutch and applying the brake.

The outer end of the rock-shaft carries a lever 89 for shifting the driven shaft in clutch-engaging direction. The lever 89 has a yielding connection with a treadle rod 90 secured to the usual controller treadle, not shown. The upper end of the treadle rod is screwed into a tubular head 91, Fig. 10, receiving the ball end 92 of the lever 89 and having a longitudinal side slot 93 through which the lever passes, the slot having an enlarged end 94 for insertion of the ball end. The ball end is disposed between concave seat members 95 and 96 in the head engaged by compressed coiled springs 97 and 98. The outer end of the spring 98 is confined by an inturned flange 99 on the upper end of the head, the flange being formed after the parts are assembled. The spring 98 serves to limit the treadle pressure applied to the lever 89 and thus limits the clutching pressure and also permits a treadle travel greater than the travel necessary to effect clutching. The lower spring 97 serves as a cushion spring when the treadle rod moves upwardly.

The pulley 53 is drivingly connected to the sewing machine by a belt 100, Fig. 1. The pulley and belt are protected by an open-topped guard member 101 which has a flat end wall 102 and an arcuate peripheral wall 103, the latter being approximately coextensive with the lower half of the casing member 23. The guard member is supported by a hinge plate 104 of arcuate cross section adapted to fit against the curved bottom of the casing member 23 when the guard member is in its normal position. The end of the hinge plate distant from the guard member has spaced apertured ears 105 which flank downwardly projecting apertured ears 106 formed on the casing member and are pivotally secured thereto by a transverse pivot pin 107. The arcuate peripheral wall of the guard member rests on the concave upper surface of the free end of the hinge plate and is adjustably secured thereto by a nut-bearing screw 108 which passes through an opening 109 of the hinge plate and through a peripheral slot 110 in the arcuate wall of the guard member. The hinge plate also has upwardly projecting lugs 111 at opposite sides which fit in the guard member slot 110 to align the guard member. By this construction the guard member can be turned through a considerable angle about the axis of the casing member to accommodate various angular positions of the belt. The hingle plate 104 has an opening 112 to admit therethrough a lug 113 projecting downwardly from the bottom of the casing member. The lug has a conical recess 114 adapted to receive the conically formed end of a latch pin or plunger 115 which extends longitudinally of the hinge plate and is slidably mounted in a hollow downwardly projecting rib 116 of the plate. A coiled spring 117 surrounds the plunger and urges it in latching direction. The plunger 115 has a knob 118 at its other end for releasing the plunger.

When the belt requires replacement the latch plunger is released, permitting the guard to swing down to a freely suspended position below the casing member, whereupon the pulley is readily accessible. The upper nut 34 of the casing suspension rod 30 is screwed upwardly on the rod so as to facilitate removal of the old belt and installation of the new belt, and the nuts are readjusted. After replacement of the belt the guard is swung upwardly and latched in its normal position.

In the operation of the transmitter, the motor 27 runs continuously, driving the fly-wheel 39. When power is to be transmitted to the sewing machine, the operator moves the treadle rod 90 downwardly, effecting a small angular movement of the rock-shaft 76 against the action of the return spring 85. The eccentric pin 81 at the inner end of the rock-shaft moves the slidable sleeve 47 inwardly, thus axially shifting the driven shaft 45 and bringing the clutch disk 56 away from the brake shoe 62 and against the clutch lining 59 of the fly-wheel. Any lost motion of the treadle rod is taken up by the spring 98, which may also serve to limit the clutching pressure. The driven shaft is quickly accelerated to the speed of the motor, and the belt 100 transmits the power to the sewing machine. Upon release of treadle pressure, the torsion spring 85 angularly shifts the rock-shaft in the opposite direction, moving the sleeve 47 outwardly to release the clutch disk from the fly-wheel clutch lining 59 and to engage the disk with the brake lining 62, thus quickly bringing the driven shaft to a stop. The axial travel of the clutch disk between clutching and braking positions is quite small and is readily adjusted by the wedge-shifting screw 75 to suit the requirements of the operator. The return spring or torsion spring 85 is exterior to the casing and can be replaced without disturbing the closed transmitter casing.

The driven shaft 45 is readily aligned with the motor shaft since the ball bearing 43 for the driven shaft is carried by the fly-wheel. The two bearings 43 and 51 for the driven shaft are widely spaced, and the clutch disk is carried on this shaft at a point between the bearings, thus minimizing any tendency to whip or vibrate. The several ball bearings are preferably identical.

The closed transmitter casing not only protects the moving parts therein but also avoids possibility of injury to the operator and to clothing.

What we claim as new and desire to secure by Letters Patent is:

1. In a power transmitter, a rotatable driving element, an axially shiftable shaft coaxial therewith, a first bearing for said shaft carried by said driving element, a second bearing for said shaft axially distant from said first bearing, a driven element carried on said shaft between said bearings and having an annular clutch portion adapted to engage said driving element when said shaft is axially moved in one direction, said annular clutch portion surrounding said first bearing, brake means adapted to be engaged by said driven element when said shaft is axially moved in the other direction, and actuating means for axially shifting said shaft to cause said driven element to engage either said driving element or said brake means.

2. In a power transmitter, a frame, a rotatable driving element, a first bearing mounted axially in said driving element, an axially shiftable shaft coaxial with said driving element, a sleeve axially movable in said frame coaxially of said shaft and movable with said shaft, a second bearing mounted in said sleeve, said shaft having a portion journalled in the bearing of said driving element and another portion journalled in said sleeve bearing, a driven element carried on said shaft between said bearings and adapted to engage said driving element when said shaft is axially moved in one direction, brake means adapted to be engaged by said driven element when said shaft is axially moved in the other direction, and actuating means for axially shifting said sleeve to cause said driven element to engage either said driving element or said brake means.

3. In a power transmitter, a frame, a rotatable driving element, an axially shiftable rotatable shaft coaxial with said driving element, clutch means for drivingly connecting said driving element and shaft when said shaft is axially moved in one direction, brake means for braking said shaft when said shaft is axially moved in the other direction, a sleeve axially movable in said frame and having said shaft journalled therein for axial movement therewith, said sleeve having a lateral recess, said frame having a radial bore opening at inner and outer ends of said bore and extending radially of said sleeve, and actuating means for said shaft including a rock-shaft journalled in said radial bore and having a terminal eccentric portion fitting in said recess for axially moving said sleeve, said eccentric portion of the rock shaft lying wholly within the projected circumference of said bore to permit insertion of said rock-shaft into said bore from the outer end of said bore.

4. In a power transmitter, a frame, a rotatable driving element, an axially shiftable rotatable shaft coaxial with said driving element, clutch means for drivingly connecting said driving element and shaft when said shaft is axially moved in one direction, brake means for braking said shaft when said shaft is axially moved in the other direction, a laterally recessed sleeve axially movable in said frame and having said shaft journalled therein for axial movement therewith, said frame having a bore opening at the inner and outer ends of said bore and extending radially of said sleeve, a rock-shaft journalled in said frame bore and having an eccentric inner end portion interengaging said sleeve for axially moving said sleeve, said eccentric portion of the rock-shaft lying wholly within the projected circumference of said bore to permit insertion of the shaft into said bore from the outer end of said bore, a spring at the outer end portion of said rock-shaft for turning said rock-shaft in one direction, and a lever at the outer end portion of said rock-shaft for turning said rock-shaft in the other direction.

5. In a power transmitter, a frame having an electric motor including a rotary member with a driving element, an axially shiftable shaft coaxial with said rotary member, a first ball bearing for said shaft carried by said rotary member, a sleeve axially movable in said frame and axially spaced from said rotary member, a second ball bearing for said shaft carried in said sleeve, a driven element carried on said shaft between said ball bearings and adapted to be moved in one direction into clutching engagement with said driving element, said driving element having an axial recess in which said first ball bearing is mounted, a brake element against which said driven element is adapted to be moved by movement of said shaft in the other direction, and actuating means for moving said sleeve and shaft in opposite directions to clutching and braking positions.

6. In a power transmitter, a hollow frame having a wall at one end with an inwardly projecting tubular hub portion, an electric motor secured to the other end of said frame and having a rotatable driving element in said frame, a sleeve slidable in said hub portion, said driving element having a hollow hub portion projecting axially towards said sleeve, an axially shiftable shaft coaxial with said driving element and journalled in said sleeve and in the projecting hub portion of said driving element, a brake element carried by said frame, a driven element on said shaft between the journalled regions of said shaft and having a portion disposed between said driving element and brake element, and actuating means for axially shifting said sleeve to cause said driven element to engage either said driving element or said brake element.

7. In a power transmitter, a frame, a rotatable driving member, an axially shiftable rotatable driven member coaxial with said driving member, actuating means for axially shifting said driven member, clutch means for drivingly connecting said members when said driven member is shifted in one direction, a brake member engageable by said driven member when said driven member is shifted in the other direction, a wedge member slidably mounted on said frame for generally radial movement with respect to said frame, said wedge member being interposed between the back of said brake member and a portion of said frame, spring means for holding said brake member against said wedge member and for holding said wedge member against said frame, and a screw-threaded adjusting member extending outwardly from said wedge member in the direction of travel thereof and operatively connected therewith for moving said wedge member in wedging direction.

8. In a power transmitter, a frame, a rotatable driving member, an axially shiftable rotatable driven member coaxial with said driving member, actuating means for axially shifting said driven member, clutch means for drivingly connecting said members when said driven member is shifted in one direction, a brake member engageable by said driven member when said driven member is shifted in the other direction, said brake member having side flanges, and said frame having a portion slidably fitting between said flanges, a wedge member disposed between said flanges and slidably mounted on said frame for generally radial movement with respect to said frame, said wedge member being interposed between the back of said brake member and said frame portion, spring means for holding said brake member against said wedge member, and for holding said wedge member against said frame, and a screw-threaded adjusting member extending outwardly from said wedge member in the direction of travel thereof and operatively connected therewith for moving said wedge member in a direction parallel to said brake member flanges.

9. In a power transmitter, a frame having an exterior part with a lateral opening exposed at the exterior of the frame, a rotatable driving member, a rotatable driven member, clutch means for drivingly connecting said driven member to said driving member, actuating means for said clutch means including a rock-shaft journalled adjacent to said frame and extending in said frame part, a lever on said rock-shaft, an arm-forming pin projecting laterally from said shaft through said lateral opening and confining said rock-shaft against outward displacement, and a return spring for said rock-shaft secured to said frame and the outer portion of said pin.

References Cited in the file of this patent

UNITED STATES PATENTS

| Number | Name | Date |
|---|---|---|
| 1,438,457 | Morton | Dec. 12, 1922 |
| 1,865,022 | Larson | June 28, 1932 |
| 2,004,055 | Peets et al. | June 4, 1935 |
| 2,095,203 | Peets | Oct. 5, 1937 |
| 2,179,360 | Vasta | Nov. 7, 1939 |
| 2,210,135 | Tautz et al. | Aug. 6, 1940 |
| 2,263,156 | Abel | Nov. 18, 1941 |
| 2,269,788 | Schenk | Jan. 13, 1942 |
| 2,274,457 | Peets et al. | Feb. 24, 1942 |
| 2,478,041 | Chason | Aug. 2, 1949 |
| 2,518,725 | Sauer et al. | Aug. 15, 1950 |